US008964125B2

(12) United States Patent  
Furihata et al.

(10) Patent No.: US 8,964,125 B2  
(45) Date of Patent: Feb. 24, 2015

(54) IMAGE DISPLAY APPARATUS AND METHOD OF CONTROLLING IMAGE DISPLAY APPARATUS

(71) Applicant: Seiko Epson Corporation, Tokyo (JP)

(72) Inventors: Takeshi Furihata, Okaya (JP); Hirokazu Kamatori, Azumino (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 14/039,411

(22) Filed: Sep. 27, 2013

(65) Prior Publication Data  
US 2014/0092312 A1 Apr. 3, 2014

(30) Foreign Application Priority Data  
Oct. 2, 2012 (JP) ................ 2012-220086

(51) Int. Cl.  
H04N 5/268 (2006.01)  
H04N 5/44 (2011.01)  
H04N 21/436 (2011.01)

(52) U.S. Cl.  
CPC ............. *H04N 5/268* (2013.01); *H04N 5/4403* (2013.01); *H04N 21/436* (2013.01)  
USPC ........................................................ 348/706

(58) Field of Classification Search  
USPC ................ 348/706, 705, 725, 723, 552–553, 348/460–461; 370/265, 351, 503  
See application file for complete search history.

(56) References Cited

U.S. PATENT DOCUMENTS

| 7,701,452 | B2 | 4/2010 | Fujiwara | |
|---|---|---|---|---|
| 7,822,879 | B2 | 10/2010 | Lida et al. | |
| 7,835,289 | B2 | 11/2010 | Lida et al. | |
| 7,835,382 | B2 | 11/2010 | Lida et al. | |
| 8,085,858 | B2 | 12/2011 | Lida et al. | |
| 8,593,996 | B2* | 11/2013 | Lee et al. | 370/265 |
| 2011/0206035 | A1* | 8/2011 | Lee et al. | 370/351 |
| 2012/0314713 | A1* | 12/2012 | Singh et al. | 370/401 |
| 2012/0314720 | A1* | 12/2012 | Lee et al. | 370/474 |
| 2012/0324120 | A1* | 12/2012 | Lee et al. | 709/228 |
| 2013/0279693 | A1* | 10/2013 | Rothschild | 380/200 |
| 2014/0016034 | A1* | 1/2014 | Cirstea | 348/460 |
| 2014/0044121 | A1* | 2/2014 | Lee et al. | 370/351 |
| 2014/0092312 | A1* | 4/2014 | Furihata et al. | 348/706 |

FOREIGN PATENT DOCUMENTS

JP A-2006-285167 10/2006

* cited by examiner

Primary Examiner — Paulos M Natnael  
(74) Attorney, Agent, or Firm — Oliff PLC

(57) ABSTRACT

An image display apparatus includes: an HDBaseT receiver circuit that receives signals based on N (N is an integer number satisfying N≥2) standards that can be transmitted as HDBaseT signals; a dedicated receiver circuit that is compliant with only a first standard of the N standards and receives signals of the first standard; a signal processing unit that processes the signals received by the HDBaseT receiver circuit or the dedicated receiver circuit; and a circuit switching unit that switches an output target circuit that outputs the signals of the first standard to the signal processing unit to one of the HDBaseT receiver circuit and the dedicated receiver circuit.

10 Claims, 9 Drawing Sheets

| BEHAVIOR MODE (AT SELECTION OF HDBaseT) \ OPERATION MODE | | NETWORK STANDBY MODE | DEEP STANDBY MODE |
|---|---|---|---|
| LAMP / FAN | ON | OFF | OFF |
| VIDEO / SOUND | ON | OFF | OFF |
| HDBaseT RECEIVER CIRCUIT | FULL-OPERATION STATUS | SECOND LPF STATUS HDMI (NOT PROCESSABLE) | FIRST LPF STATUS UART / IR (PROCESSABLE) |

FIG. 4

| SIGNAL STANDARD \ OPTIONS | HDBaseT RECEIVER CIRCUIT | DEDICATED RECEIVER CIRCUIT |
|---|---|---|
| Ethernet SIGNAL | NOT SELECTED | SELECTED (Phy RECEIVER CIRCUIT) |
| HDMI SIGNAL | NOT SELECTED | SELECTED (HDMI RECEIVER CIRCUIT) |
| UART SIGNAL | NOT SELECTED | SELECTED (UART RECEIVER CIRCUIT) |
| IR SIGNAL | NOT SELECTED | SELECTED (IR RECEIVER CIRCUIT) |

FIG. 9

IMAGE DISPLAY APPARATUS AND METHOD OF CONTROLLING IMAGE DISPLAY APPARATUS

The entire disclosure of Japanese Patent Application No. 2012-220086, filed October 2 is expressly incorporated by reference herein.

BACKGROUND

1. Technical Field

The present invention relates to a LAN-connectable image display apparatus and a method of controlling the image display apparatus.

2. Related Art

In related art, projectors that can receive video signals and control signals when connected to personal computers via LAN cables have been known (for example, Patent Document 1 (JP-A-2006-285167)). For the projectors having the network function, generally, RJ45 connector is used as input terminals for Ethernet signals (registered trademark).

On the other hand, recently, HDBaseT standards have been established, and long-distance transmission of not only the Ethernet signals but also HDMI (High-Definition Multimedia Interface) signals, UART (Universal Asynchronous Receiver Transmitter) signals, IR (Infra Red) signals has been enabled by mounting receiver circuits compliant with the standards. Note that "HDBaseT standards" refer to connection standards established by HDBaseT Alliance. Further, when the signals based on the HDBaseT standards are received, the RJ 45 connectors also are used as the input terminals.

However, the specifications at the transmitters of the HDBaseT signals are arbitrary, and the transmitters may be compliant with the HDMI signals only. In this case, when only one RJ45 connector for receiving the HDBaseT signals is provided at the projector side (receiver side), there is a problem that reception (transmission) of other signals than the HDMI signals is impossible.

SUMMARY

An advantage of some aspects of the invention is to provide an image display apparatus that can constantly perform selective reception of signals received via HDBaseT and signals received via other paths among signals that can be transmitted on HDBaseT regardless of the specifications at the transmitter side of the HDBaseT signals, and a control method of controlling the image display apparatus.

An aspect of the invention is directed to an image display apparatus including an HDBaseT receiver circuit that receives signals based on N (N is an integer number satisfying N≥2) standards that can be transmitted as HDBaseT signals, a dedicated receiver circuit that is compliant with only a first standard of the N standards and receives signals of the first standard, a signal processing unit that processes the signals received by the HDBaseT receiver circuit or the dedicated receiver circuit, and a circuit switching unit that switches an output target circuit that outputs the signals of the first standard to the signal processing unit to one of the HDBaseT receiver circuit and the dedicated receiver circuit.

Another aspect of the invention is directed to a method of controlling an image display apparatus including processing signals received by one of an HDBaseT receiver circuit that receives signals based on N (N is an integer number satisfying N≥2) standards that can be transmitted as HDBaseT signals and a dedicated receiver circuit that is compliant with only a first standard of the N standards and receives signals of the first standard using a signal processing unit, and switching an output target circuit that outputs the signals of the first standard to the signal processing unit to one of the HDBaseT receiver circuit and the dedicated receiver circuit.

According to the configurations, the HDBaseT receiver circuit compliant with HDBaseT and the dedicated receiver circuit compliant with only the first standard are separately provided, and thus, the signals of the first standard may be constantly received regardless of the specifications at the HDBaseT transmitter side. Further, the output target circuit that outputs the signals of the first standard to the signal processing unit is switched to one of the HDBaseT receiver circuit and the dedicated receiver circuit, and thus, independent two signal processing units are not necessary. Accordingly, cost rise may be suppressed while the function of constantly receiving signals of the first standard is provided.

Note that "signals of first standard" refers to Ethernet signals, HDMI signals, UART signals, IR signals, or the like that can be transmitted on the HDBaseT standards.

Further, "circuit switching unit" may be made switchable in response to a user operation or may be made switchable in response to another factor (e.g., external signals that can be received by other than the receiver circuits, the internal state of the equipment, or the like).

Furthermore, "image display apparatus" refers to a device that displays images including a projector, a television, a computer, a tablet terminal, an STB (Set Top Box), and an AV amplifier or a device that allows another display device to display images.

The image display apparatus of the aspect of the invention may be configured such that the image display apparatus further includes individual power supply circuits that individually supply power to the respective receiver circuits of the HDBaseT receiver circuit and the dedicated receiver circuit, a power supply control unit that performs power supply control on the respective individual power supply circuits, and a mode switching unit that switches a behavior mode of the image display apparatus to one of an operation mode and a standby mode, and the power control unit does not supply power to the individual power supply circuit not corresponding to the output target circuit in the standby mode.

According to the configuration described above, power is not supplied to the individual power supply circuit not corresponding to the output target circuit in the standby mode, and thus, power consumption may be suppressed.

The image display apparatus of the aspect of the invention may be configured such that the image display apparatus further includes an operation status switching unit that switches an operation status of the HDBaseT receiver circuit among a full-operation status in which signals of the N standards can be received, a second LPF status in which signals of L (L is an integer number satisfying 1≤L≤N−1) types of standards including the signal of the first standard can be received, and a first LPF status in which signals of M (M is an integer number satisfying 1≤M≤L−1) types of standards not including the signals of the first standard can be received, and, in the case where the output target circuit has been switched to the HDBaseT receiver circuit in the standby mode, the operation status switching unit switches the operation status of the HDBaseT receiver circuit to the second LPF status if the signals of the first standard are input to the HDBaseT receiver circuit, and switches the operation status of the HDBaseT receiver circuit to the first LPF status if the signals of the first standard are not input to the HDBaseT receiver circuit.

According to the configuration described above, in the case where the output target circuit has been switched to the HDBaseT receiver circuit in the standby mode, the operation status of the HDBaseT receiver circuit is switched to the second LPF status in which the number of signals that can be received is smaller than that in the full-operation status, if the signals of the first standard are input to the HDBaseT receiver circuit, and thereby, power saving may be realized. Further, the operation status of the HDBaseT receiver circuit is switched to the first LPF status in which the number of signals that can be received is smaller than that in the second LPF status if the signals of the first standard are not input to the HDBaseT receiver circuit, and thereby, further power saving may be realized.

The image display apparatus according to the aspect of the invention may be configured such that the image display apparatus further includes a signal determination unit that determines whether or not the signals of the first standard input to the dedicated receiver circuit are signals for HDBaseT receiver circuit transmitted from an HDBaseT transmitter circuit, and a warning unit that issues a warning if the signal determination unit has determined that the signals of the first standard input to the dedicated receiver circuit are the signals for HDBaseT receiver circuit.

According to the configuration described above, a warning is issued if the determination that the signals of the first standard input to the dedicated receiver circuit are the signals for HDBaseT (receiver) circuit has been made, and thus, improper connection may be prevented. On the other hand, if the signals for dedicated receiver circuit are input to the HDBaseT receiver circuit, processing may be normally performed, and thus, more effective determination may be performed by determination using the signals input to the dedicated receiver circuit.

The image display apparatus according to the aspect of the invention may be configured such that the power supply control unit does not supply power to the dedicated receiver circuit if the signal determination unit has determined that the signals of the first standard input to the dedicated receiver circuit are the signals for HDBaseT receiver circuit.

According to the configuration described above, if the determination that the signals of the first standard input to the dedicated receiver circuit are the signals for HDBaseT receiver circuit has been made, processing by the dedicated receiver circuit is impossible and power is not supplied, and thereby, wasteful power consumption may be prevented. Even in the case where the output target circuit has been switched to the dedicated receiver circuit, the same advantage may be exerted.

The image display apparatus of the aspect of the invention may be configured such that the image display apparatus further includes an operation unit for a user to select the output target circuit, and the circuit switching unit switches the output target circuit according to a selection operation of the operation unit.

According to the configuration described above, one of the HDBaseT receiver circuit and the dedicated receiver circuit may be selected as the output target circuit in response to the need of the user.

The image display apparatus of the aspect of the invention may be configured such that the image display apparatus includes N of the dedicated receiver circuits that respectively receive signals of different standards, and the circuit switching unit respectively switches the output target circuits of the N signals to one of the HDBaseT receiver circuit and the dedicated receiver circuits.

According to the configuration described above, not only the signals of the first standard but also the signals of the N standards that can be received by the HDBaseT receiver circuit may be constantly received regardless of the specifications at the transmitter side for HDBaseT signals. Thereby, an interface with higher convenience for the user may be realized.

The image display apparatus according to the aspect of the invention may be configured such that the signals of the first standard are Ethernet signals.

According to the configuration described above, the Ethernet signals maybe constantly received regardless of the specifications at the transmitter side for HDBaseT signals. Further, not only the Ethernet signals but other signals can be received at the same time, and thus, Ethernet signals (control signals) may be received while HDMI signals (video signals) are displayed or Ethernet signals (other video signals) are set standby as a rear window during display of the HDMI signals (video signals).

BRIEF DESCRIPTION OF THE DRAWINGS

The invention will be described with reference to the accompanying drawings, wherein like numbers reference like elements.

FIG. 4 is an explanatory diagram on behavior modes of the projector.

FIG. 9 is an explanatory diagram on receiver circuit options according to the second embodiment.

DESCRIPTION OF EXEMPLARY EMBODIMENTS

First Embodiment

As below, one embodiment of the invention will be explained in detail with reference to the accompanying drawings. In a first embodiment, the case where "signals of first standard" in the appended claims are Ethernet signals will be exemplified. Further, as "image display apparatus" in the appended claims, a projector 1 will be exemplified.

Figure 1:
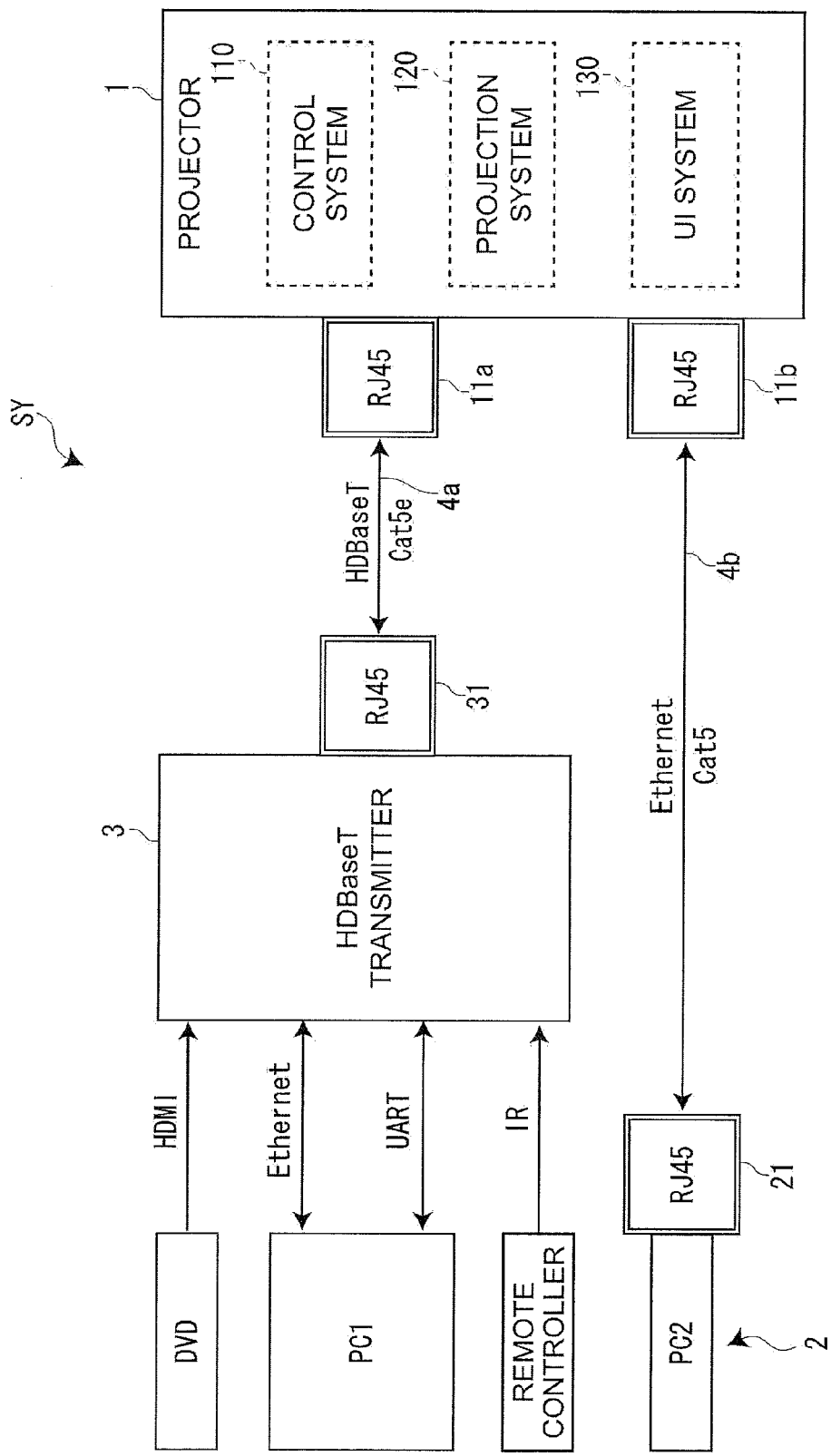
FIG. 1 is a system configuration diagram of a projection system according to the first embodiment.

FIG. 1 is a system configuration diagram of a projection system SY according to the first embodiment. The projection system SY includes the projector 1 (image display apparatus), an HDBaseT transmitter 3 that transmits HDBaseT signals to the projector 1, and various kinds of electronic equipment 2 that output various signals that can be transmitted as the HDBaseT signals.

As the electronic equipment 2, in the embodiment, a DVD (Digital Versatile Disc), a PC (Personal computer), a remote controller, or the like is used. The DVD outputs HDMI (High-definition Multimedia Interface) signals, the PC (Personal computer) outputs Ethernet signals and UART (Universal Asynchronous Receiver Transmitter) signals, and the remote controller outputs IR (Infra Red) signals. All of the signals based on the various standards can be transmitted based on the connection standards of HDBaseT. Note that the electronic equipment 2 is not limited to those, but may be applied to equipment capable of outputting signals that can be transmitted according to HDBaseT.

The HDBaseT transmitter 3 receives signals output from the DVD, PC1, and the remote controller, and transmits the HDBaseT signals to the projector 1. Further, in the HDBaseT transmitter 3, an RJ45 connector 31 is provided and HDBaseT signals are transmitted via a Cat5e cable 4a. On the other hand, the PC2 directly transmits Ethernet signals to the projector 1 not via the HDBaseT transmitter 3. Furthermore, in the PC2, an RJ45 connector 21 is provided and Ethernet signals are transmitted via a Cat5 cable 4b.

In the projector 1, two RJ45 connectors of an RJ45 connector 11a to which the Cat5e cable 4a (or a cable on a category on the higher standard) is connected and an RJ45 connector 11b to which the Cat5 cable 4b is connected are provided, and HDBaseT signals and Ethernet signals are received, respectively. As described above, the projector 1 of the embodiment has the two RJ45 connectors 11a, 11b for HDBaseT signals and Ethernet signals, and may reliably receive Ethernet signals regardless of the specifications of the HDBaseT transmitter 3 (even when the HDBaseT transmitter 3 has the specifications compliant with HDMI signals only).

Further, the component elements of the projector 1 are roughly divided into a control system 110, a projection system 120, and a UI (User Interface) system 130 (operation unit). The projection system 120 is a mechanism of displaying a projection image on a projection surface (screen), and refers to a light source, a light modulator, a projection lens, etc. Further, the UI system 130 refers to a remote controller for the projector 1, an operation panel provided on the projector 1 main body, an OSD (On Screen Display) processing unit, etc. The OSD processing unit displays an operation window and a warning on the projection surface, and performs display processing under the control of the control system 110.

Figure 2:
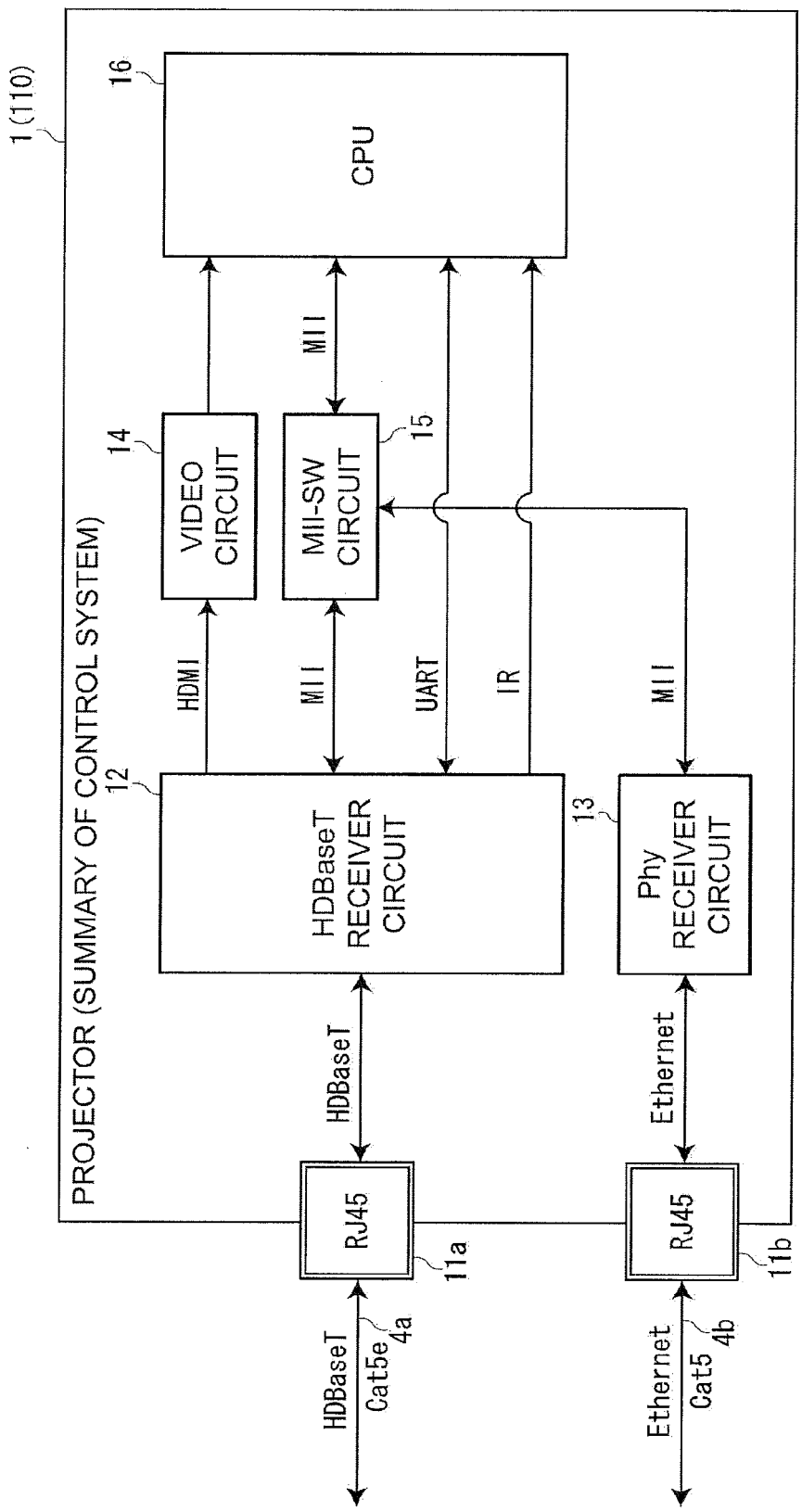
FIG. 2 is a schematic block diagram of a control system of a projector.

Next, referring to FIG. 2, the summary of the control system 110 of the projector 1 will be explained. The projector 1 includes an HDBaseT receiver circuit 12, a Phy (Physical Layer) receiver circuit 13 (dedicated receiver circuit), a video circuit 14, an MII (Media Independent Interface)-SW circuit (circuit switching unit) 15, and a CPU (Central Processing Unit) 16 as the control system 110.

The HDBaseT receiver circuit 12 receives the HDBaseT signals input from the RJ45 connector 11a, decodes the HDBaseT signals, and outputs HDMI signals, MII signals (signals corresponding to Ethernet signals and converted for connecting a MAC layer and a physical layer in Ethernet signal processing), UART signals, and IR signals. That is, the circuit can receive and process the signals based on a plurality of standards (four standards in the embodiment) compliant with HDBaseT. The Phy receiver circuit 13 receives Ethernet signals input from the RJ45 connector 11b, converts the signals into MII signals, and outputs them. The video circuit 14 performs analysis and processing on video signals contained in the HDMI signals.

The MII-SW circuit 15 switches an output target circuit that outputs MII signals (Ethernet signals, signal of first standard) to the CPU 16 to one of the HDBaseT receiver circuit 12 and the Phy receiver circuit 13. Further, MII signals are input from the switched output target circuit (HDBaseT receiver circuit 12 or Phy receiver circuit 13) and output to the CPU 16. The output target circuit is switched in response to a selection operation by the user using the UI system 130, and, hereinafter, the receiver circuit selected by the user will be also referred to as "selected receiver circuit". Note that the selection of the receiver circuit may be performed by a configuration in which options are displayed as an OSD menu, for example, for the user to select one of the options, or a configuration in which buttons for the respective receiver circuits assigned to the remote controller and the operation panel are pressed down. On the other hand, the CPU 16 is a central processing unit that controls the entire projector 1, and performs signal input/output control between the respective units and itself, mode switching control, power supply control, etc.

Next, referring to FIG. 3, the control by the CPU 16 etc. will be explained further in detail. Note that, in the drawing, signal lines other than those for MII signals are omitted for convenience. The projector 1 includes an Ethernet signal determination circuit 17 (signal determination unit) as another element of the control system 110. Further, the projector includes a power supply circuit 18 and an individual power supply circuit 50 as the power supply system.

The power supply circuit 18 supplies power from an external power supply to the individual power supply circuit 50. Further, the individual power supply circuit 50 includes a HDBaseT power supply circuit 51 that supplies power to the HDBaseT receiver circuit 12, a Phy power supply circuit 52 that supplies power to the Phy receiver circuit 13, and an MII-SW power supply circuit 53 that supplies power to the MII-SW circuit 15.

The Ethernet signal determination circuit 17 determines whether the signals input to the Phy receiver circuit 13 are HDBaseT signals or Ethernet signals. As described above, both the Cat5e cable 4a that transmits the HDBaseT signals and the Cat5 cable 4b that transmits the Ethernet signals receive using the same RJ45 connectors, and improper connection may be caused. Accordingly, whether or not the Cat5 cable 4b is properly connected to the RJ45 connector 11b is determined by the Ethernet signal determination circuit 17. As a determination method, among the four signal lines of the RJ45 connector 11b, of the two signal lines not used for transmission of the Ethernet signals, presence or absence of a signal of one of the signal lines is detected and, if "signal: present", input of an HDBaseT signal is determined and, if "signal: absent", input of an Ethernet signal is determined. When the HDBaseT signals are input, processing in the Phy receiver circuit 13 is impossible and warning processing is performed by the CPU 16 (warning unit 115), which will be described later.

The CPU 16 functions as a signal processing unit 112, a mode switching unit 113, a power control unit 114, and the warning unit 115. The signal processing unit 112 processes the signals received by the HDBaseT receiver circuit 12 or the Phy receiver circuit 13. In the embodiment, the output target circuit is switched by the MII-SW circuit 15, and processing of MII signals (Ethernet signals) from two routes may be performed by one CPU 16.

The mode switching unit 113 switches between an operation mode and a standby mode as behavior modes of the projector 1. Switching between the behavior modes is performed based on the mode switching operation by the user using the UI system 130. FIG. 4 is an explanatory diagram on the behavior modes. As shown in the drawing, the standby mode is distinguished into a deep standby mode with the lowest power consumption and a network standby mode with power consumption higher than the deep standby mode and lower than the operation mode. In the operation mode, a light source lamp and a cooling fan for cooling the lamp are activated and processing of video signals and audio signals is also performed. On the other hand, in the standby mode, the light source lamp and the cooling fan for cooling the lamp are deactivated and processing of video signals and audio signals is not performed. Further, the network standby mode is a mode in which a function of the deep standby mode and a network function are enabled.

On the other hand, the operation status of the HDBaseT receiver circuit 12 is distinguished into a full-operation status, a second LPF status, and a first LPF status, and the statuses respectively correspond to the operation mode, the network standby mode, and the deep standby mode (in the case where the HDBaseT receiver circuit 12 has been switched as the output target circuit). The full-operation status is a status in which processing of all of HDMI signals, Ethernet signals, UART signals, and IR signals is enabled. Further, the second LPF status is a status in which processing of only HDMI signals is disabled. Furthermore, the first LPF status is a status in which processing of only UART signals and IR signals is enabled (processing of only HDMI signals and Ethernet signals is disabled).

Note that the first LPF status and the second LPF status are switched in response to the presence or absence of reception of Ethernet signals by the HDBaseT receiver circuit (the details will be described later). Further, in the example of FIG. 4, the case where the HDBaseT receiver circuit 12 receives signals of four standards is explained, however, in the case where the HDBaseT receiver circuit 12 receives signals of N standards, switching between the second LPF status in which signals of L (L is an integer number to satisfy $1 \leq L \leq N-1$) types of standards including Ethernet signals can be received and the first LPF status in which signals of M (M is an integer number to satisfy $1 \leq M \leq L-1$) types of standards not including Ethernet signals can be received may be enabled.

Figure 3:
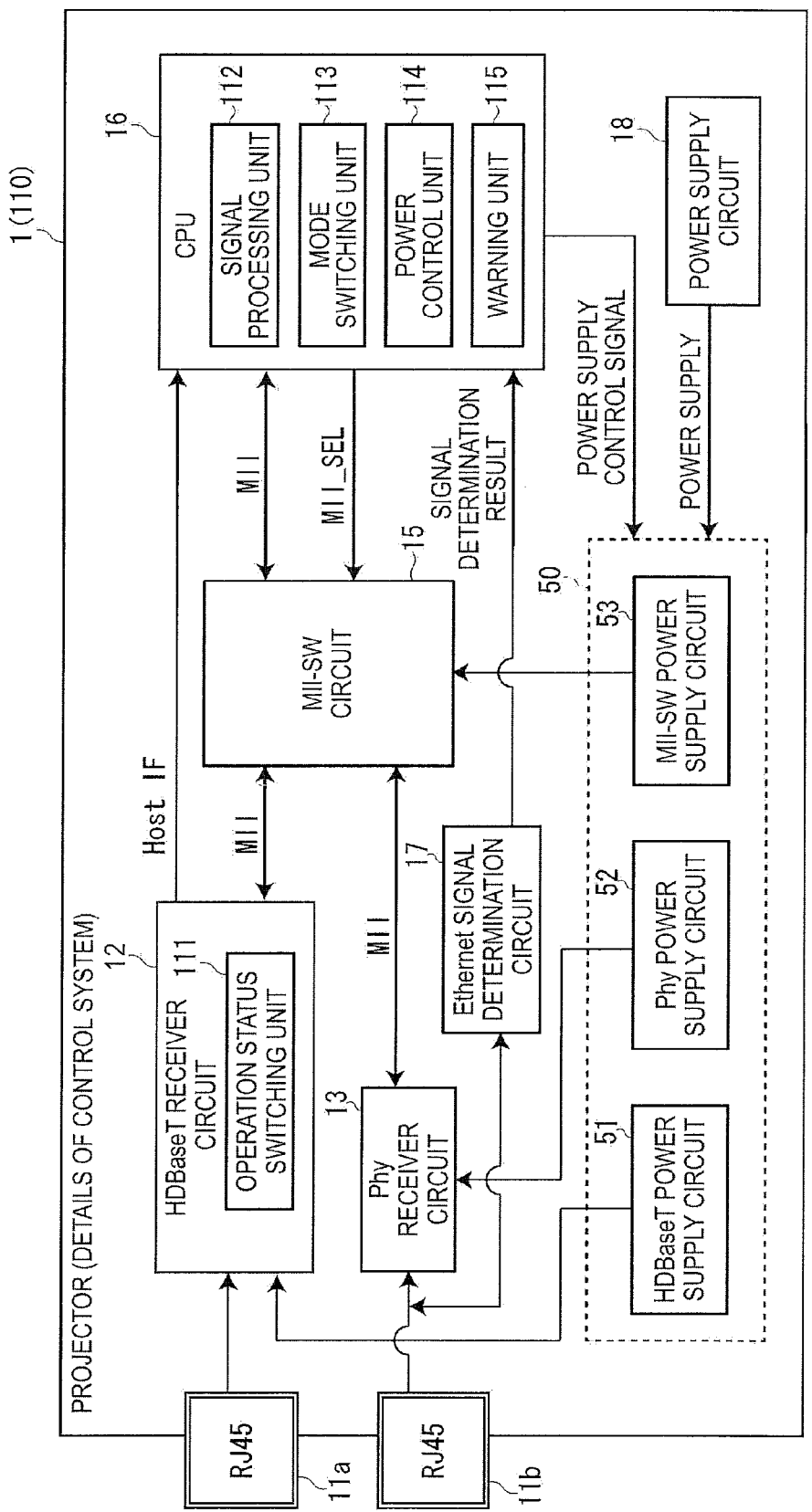
FIG. 3 is a detailed block diagram of the control system of the projector.

Returning to the explanation of FIG. 3, the power control unit 114 performs power supply control on the individual power supply circuits 51, 52, 53. Specifically, in the standby mode (the network standby mode and the deep standby mode), power is not supplied to the non-selected receiver circuit. For example, when the user selects the HDBaseT receiver circuit 12 as the selected receiver circuit, the unit outputs a power supply control signal so that the Phy power supply circuit 52 may not supply power to the Phy receiver circuit 13. Conversely, when the user selects the Phy receiver circuit 13 as the selected receiver circuit, the unit outputs a power supply control signal so that the HDBaseT power supply circuit 51 may not supply power to the HDBaseT receiver circuit 12.

Further, if the Ethernet signal determination circuit 17 has determined that the signals input to the Phy receiver circuit 13 are HDBaseT signals, the power control unit 114 does not supply power to the Phy receiver circuit 13. That is, this case is improper connection and it is impossible for the Phy receiver circuit 13 to process the HDBaseT signals, and wasteful power supply is prevented. Note that the power control unit 114 constantly supplies power to the MII-SW power supply circuit 53 regardless of the behavior mode of the projector 1 and the signals input to the Phy receiver circuit 13.

The warning unit 115 issues a warning if the Ethernet signal determination circuit 17 has determined that the signals input to the Phy receiver circuit 13 are HDBaseT signals (in the case of improper connection). Specifically, OSD display of a warning ("cable for HDBaseT signals is improperly connected" or the like) or a warning display superimposed on the projection image is considered. Further, a warning may be sounded by generation of electronic sound.

On the other hand, the HDBaseT receiver circuit 12 functions as an operation status switching unit 111. If the HDBaseT receiver circuit 12 is selected as the selected receiver circuit, the operation status switching unit 111 switches the operation status of the HDBaseT receiver circuit 12 among the full-operation status, the second LPF status, and the first LPF status (see FIG. 4). Specifically, when the behavior mode of the projector 1 is the operation mode, the status is switched to the full-operation status. Further, when the behavior mode of the projector 1 is the standby mode, if the Ethernet signals are input to the HDBaseT receiver circuit 12, the status is switched to the second LPF status, and, if the Ethernet signals are not input to the HDBaseT receiver circuit 12, the status is switched to the first LPF status. That is, even when the behavior mode of the projector 1 is switched to the standby mode, if the HDBaseT receiver circuit 12 is selected as the selected receiver circuit and the Ethernet signals are input to the HDBaseT receiver circuit 12, the HDBaseT receiver circuit 12 receives and processes the Ethernet signal. Note that, for switching the operation status of the HDBaseT receiver circuit 12, control via a Host IF signal (e.g., an I2C signal) from the CPU 16 is performed.

Then, referring to FIGS. 5A to 7, flows (algorithms) of respective processing by the CPU 16 and the HDBaseT receiver circuit 12 will be explained. FIG. 5A is a flowchart showing receiver circuit switching processing by the CPU 16. The CPU 16 determines whether or not the switching operation of the receiver circuit by the user has been performed (S11), and, if the switching operation has been performed (S11: Yes), issues a power supply start command to the selected receiver circuit (HDBaseT receiver circuit 12 or Phy receiver circuit 13) (S12). Further, the CPU issues a switching command of the selected receiver circuit to the MII-SW circuit 15 (S13, MII_SEL signal), and then, issues a power supply stop command to the non-selected receiver circuit (S14).

Figure 5B:
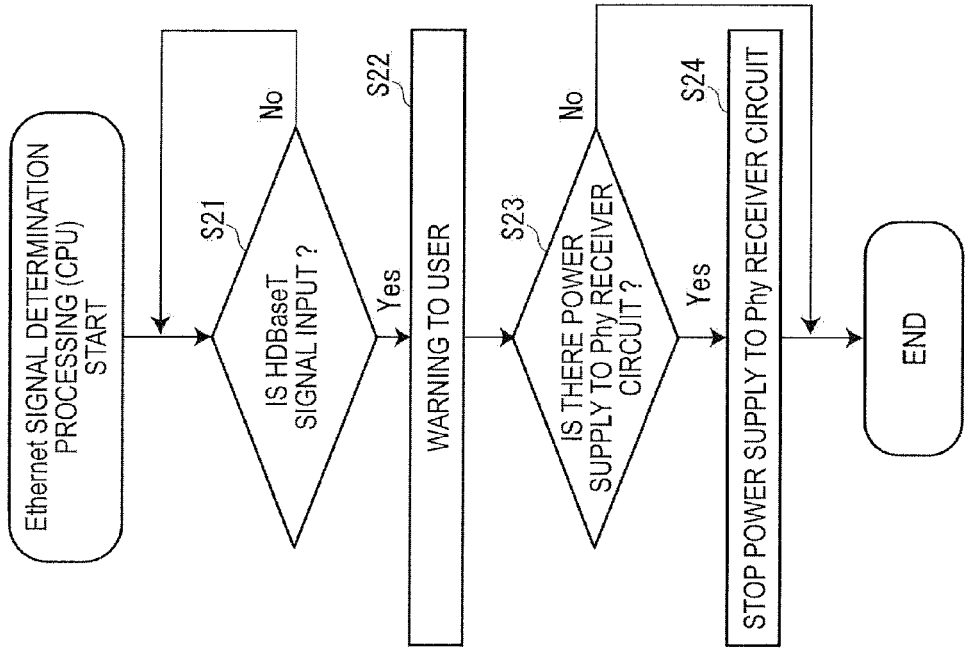
FIG. 5B is a flowchart showing Ethernet signal determination processing of the CPU.
Figure 5A:
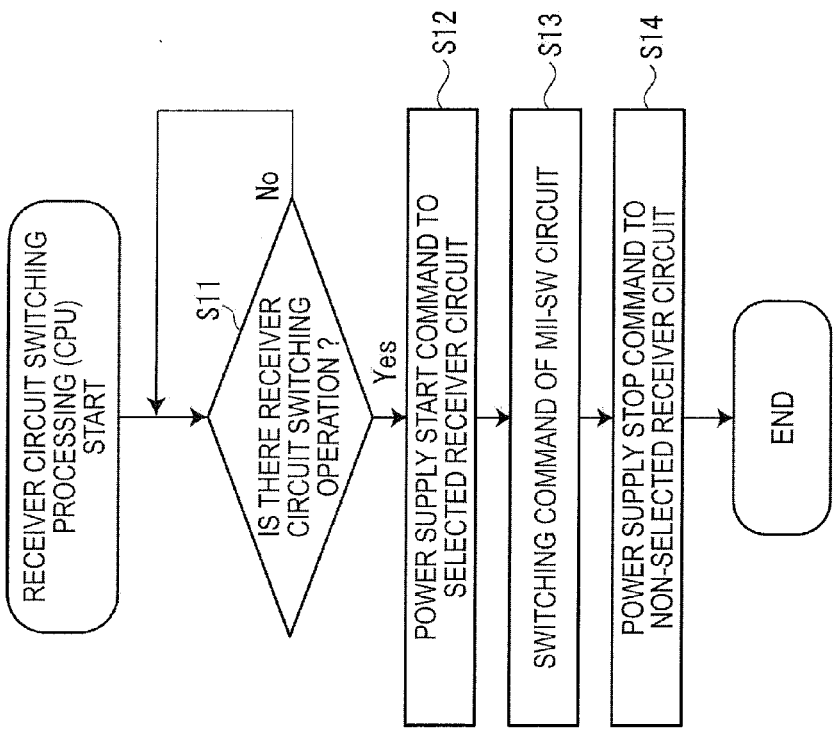
FIG. 5A is a flowchart showing receiver circuit switching processing of a CPU.

FIG. 5B is a flowchart showing Ethernet signal determination processing by the CPU 16. The CPU 16 determines whether or not the HDBaseT signals are input to the Phy receiver circuit 13 by the Ethernet signal determination circuit 17 (S21), and, if the CPU has determined that the signals are input (S21: Yes), issues a warning to the user by OSD display or the like (S22). Then, the CPU determines whether or not the power is supplied to the Phy receiver circuit 13 (the Phy receiver circuit 13 has been selected as the receiver circuit for Ethernet signals) (S23), and, if the CPU has determined that the power is supplied (S23: Yes), stops power supply to the Phy receiver circuit 13 (S24).

Figure 6B:
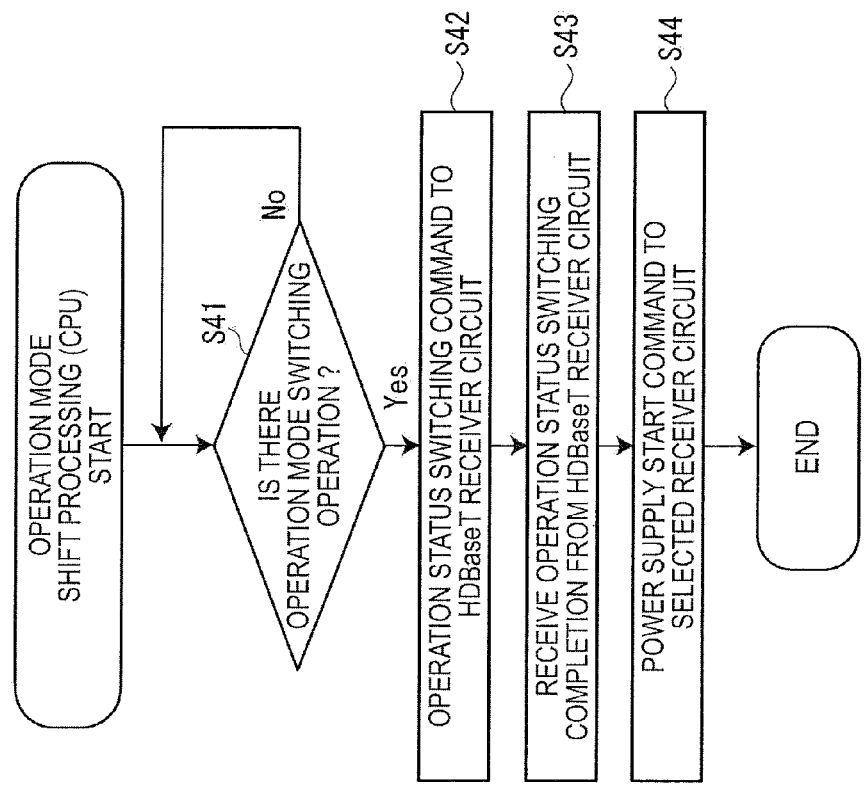
FIG. 6B is a flowchart showing operation mode shift processing.
Figure 6A:
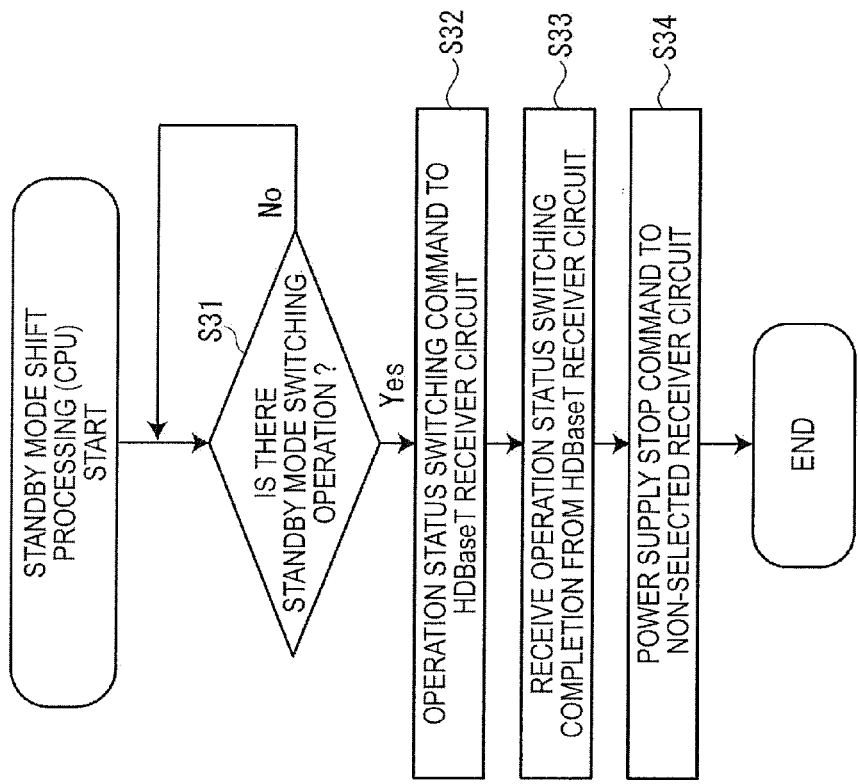
FIG. 6A is a flowchart showing standby mode shift processing.

FIG. 6A is a flowchart showing standby mode shift processing by the CPU 16. If the user has performed the switching operation from the operation mode to the standby mode (S31: Yes), the CPU 16 issues an operation status switching command to the HDBaseT receiver circuit 12 (S32), and receives an operation status switching completion signal from the HDBaseT receiver circuit 12 (S33). Then, the CPU issues the power supply stop command to the non-selected receiver circuit (HDBaseT receiver circuit 12 or Phy receiver circuit 13) (S34).

FIG. 6B is a flowchart showing operation mode shift processing by the CPU 16. If the user has performed the switching operation from the standby mode to the operation mode (S41: Yes), the CPU 16 issues the operation status switching command to the HDBaseT receiver circuit 12 (S42), and receives the operation status switching completion signal from the HDBaseT receiver circuit 12 (S43). Then, the CPU issues the power supply start command to the selected receiver circuit (HDBaseT receiver circuit 12 or Phy receiver circuit 13) (S44).

Figure 7:
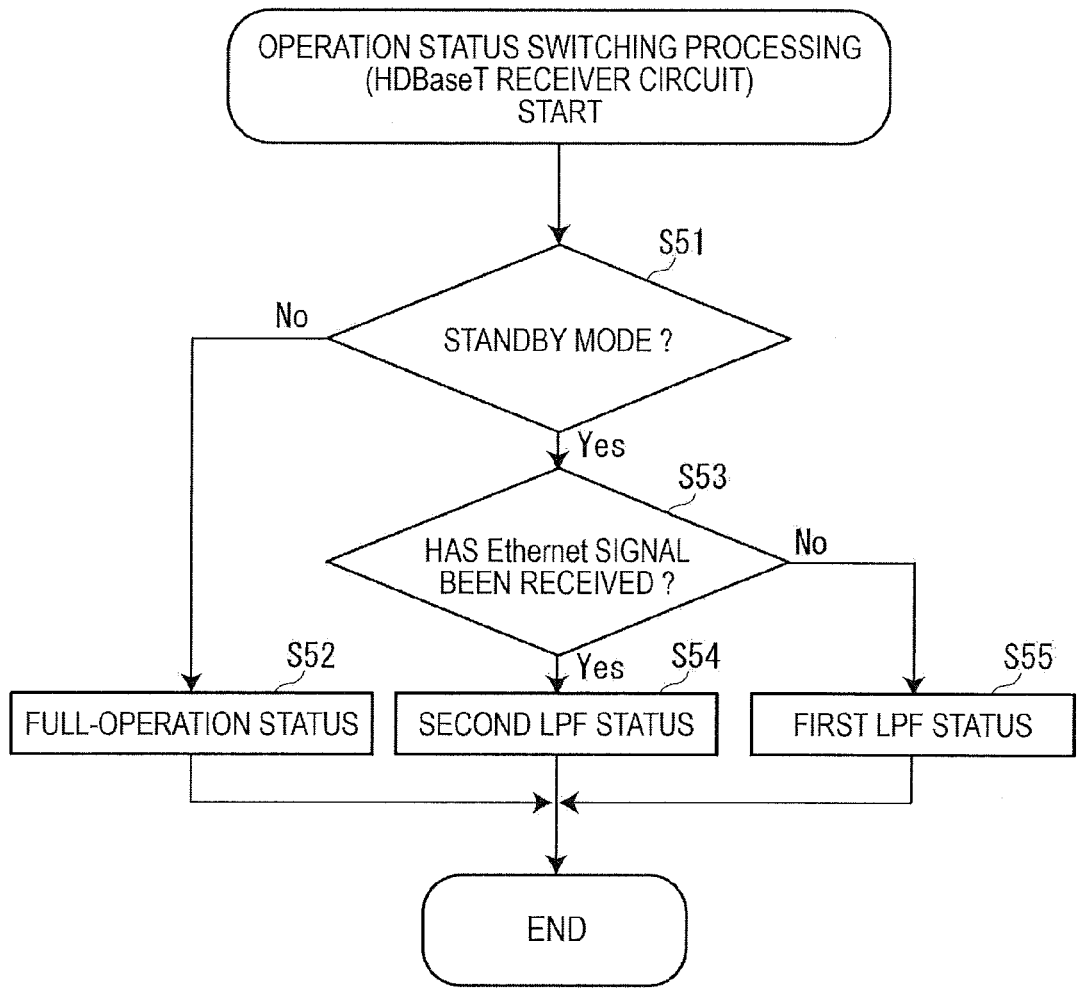
FIG. 7 is a flowchart showing operation status switching processing of an HDBaseT receiver circuit.

FIG. 7 is a flowchart showing operation status switching processing by the HDBaseT receiver circuit 12. The HDBaseT receiver circuit 12 determines whether or not the behavior mode of the projector 1 is currently the standby mode (S51), if the mode is not the standby mode (is the operation mode, S51: No), the circuit sets the operation status of itself to the full-operation status (S52). On the other hand, if the mode is the standby mode (S51: Yes), the circuit determines whether or not to have received the Ethernet signals (S53), if the circuit has received the Ethernet signals (S53: Yes), the circuit sets the operation status of itself to the second LPF status (S54). Or, if the circuit has not received the Ethernet signals (S53: No), the circuit sets the operation status of itself to the first LPF status (S55).

As has been explained above, according to the projector 1 of the first embodiment, the HDBaseT receiver circuit 12 for HDBaseT and the Phy receiver circuit 13 only for Ethernet signals are provided, and thus, the Ethernet signals may be constantly received regardless of the specifications of the HDBaseT transmitter 3. Thereby, it may be made possible that the Ethernet signals are received while the HDMI signals are displayed and the Ethernet signals are set standby as the rear window during projection of the HDMI signals. Further, the output target circuit that outputs the Ethernet signals to the CPU 16 is switched to one of the HDBaseT receiver circuit 12 and the Phy receiver circuit 13 by the MII-SW circuit 15, and two independent CPU 16 are not necessary. Accordingly, cost rise may be suppressed while the function of constantly receiving the Ethernet signals is provided.

Further, the power control unit 114 does not supply power to the non-selected receiver circuit in the standby mode, and the power consumption may be suppressed. Furthermore, even in the case where the selected receiver circuit is the HDBaseT receiver circuit 12, if the Ethernet signals are input to the HDBaseT receiver circuit 12, the operation status of the HDBaseT receiver circuit 12 is set to the second LPF status, and the power consumption in the standby mode may be further suppressed. That is, in the standby mode, if the Ethernet signals are input to the HDBaseT receiver circuit 12, power is not supplied to the Phy receiver circuit 13 and the HDBaseT receiver circuit 12 is set in the second LPF status with the lower power consumption than that of the full-operation status, and further power saving may be realized.

In addition, if the Ethernet signal determination circuit 17 has determined that the Ethernet signals input to the Phy receiver circuit 13 are the HDBaseT signals, a warning is issued, and thereby, improper connection of the cable may be prevented. Further, even when the Ethernet signals are input to the HDBaseT receiver circuit 12, processing may be normally performed, and thus, the more effective determination may be performed by determination at the Phy receiver circuit 13 side (using the signals input to the RJ45 connector 11*b*). Furthermore, if the determination that the Ethernet signals input to the Phy receiver circuit 13 are the HDBaseT signals has been made, processing by the Phy receiver circuit 13 is impossible and power is not supplied, and thereby, the wasteful power supply may be prevented.

Note that, in the above described embodiment, the power control unit 114 constantly supplies power to the MII-SW power supply circuit 53 regardless of the behavior mode of the projector 1 and the signals input to the Phy receiver circuit 13. However, in the case of setting such that the Ethernet signals may not be received (in the case where both the HDBaseT receiver circuit 12 and the Phy receiver circuit 13 are non-selected receiver circuits), power supply to the MII-SW power supply circuit 53 may be stopped.

Further, in the above described embodiment, the Ethernet signal determination circuit 17 determines the signals input to the RJ45 connector 11*b*, however, the circuit may determine the signals input to the RJ45 connector 11*a*. Note that, in the HDBaseT receiver circuit 12, the Ethernet signals transmitted from the PC2 can be processed and the user can daringly connects the Cat5 cable 40 to the RJ45 connector 11*a*, and it is preferable that power supply to the HDBaseT receiver circuit 12 is not stopped.

Second Embodiment

Next, referring to FIGS. 8 and 9, a second embodiment of the invention will be explained. In the above described first embodiment, only the Phy receiver circuit 13 compliant with Ethernet signals has been provided as "dedicated receiver circuit" (see FIG. 2 etc.), however, the embodiment is different in that dedicated receiver circuits compliant with HDMI signals, UART signals, and IR signals besides the Ethernet signals are respectively provided. As below, the difference from the first embodiment will be explained. Note that, in the embodiment, the same component parts as those of the first embodiment have the same signs and their detailed explanation will be omitted. Further, modified examples applied to the same component parts as those of the first embodiment are also applied to the embodiment.

Figure 8:
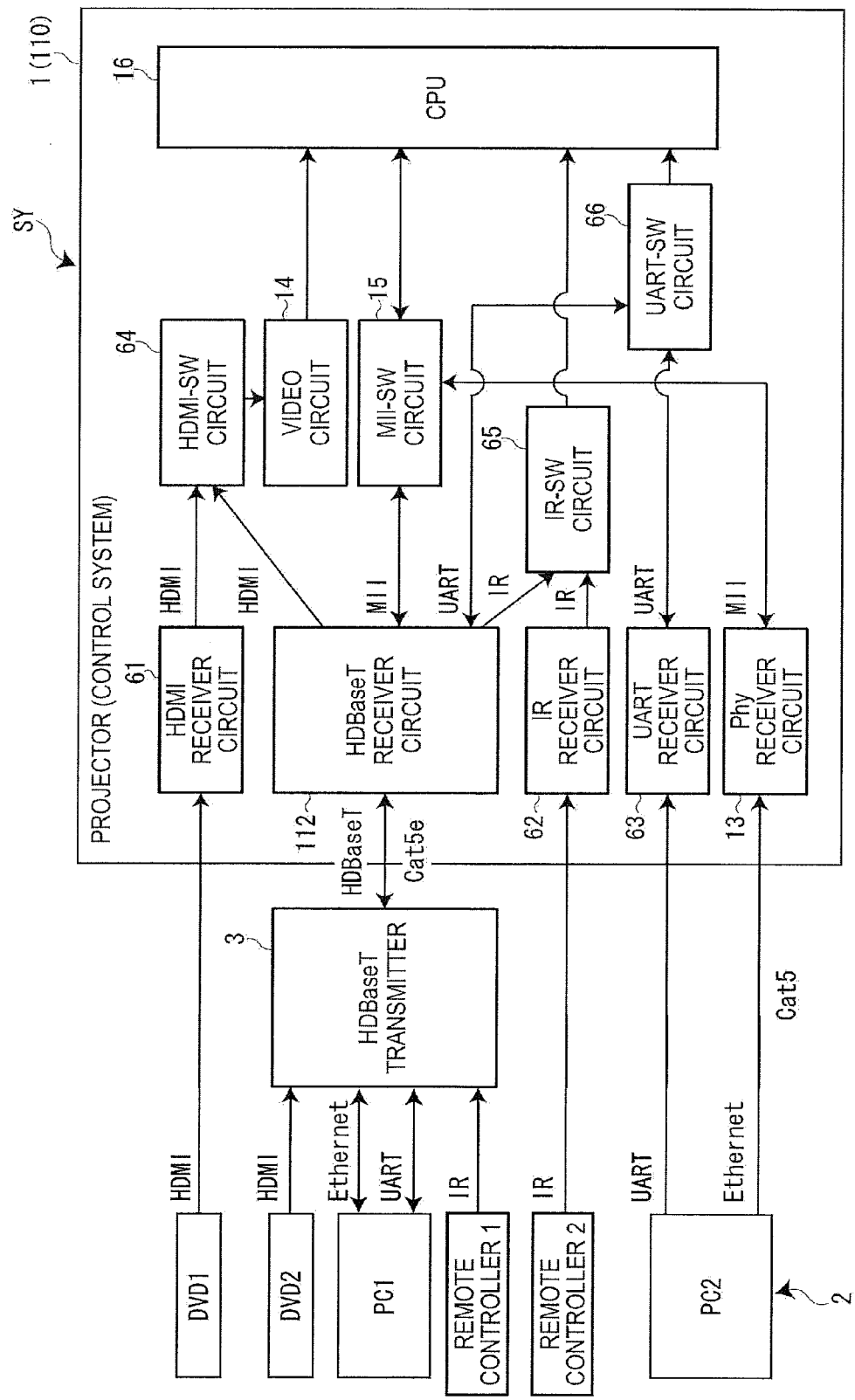
FIG. 8 is a system configuration diagram of a projection system according to the second embodiment.

FIG. 8 is a system configuration diagram of a projection system SY according to the second embodiment. The projection system SY according to the embodiment is different from that of the first embodiment (see FIGS. 1, 2, etc.) in that one DVD and one remote controller are added as the electronic equipment 2 for outputting signals and UART signals are output from the PC2. Further, the system is different in that, as the receiver circuits of the projector 1, not only the HDBaseT receiver circuit 12 and the Phy receiver circuit 13 but also an HDMI receiver circuit 61, an IR receiver circuit 62, and a UART receiver circuit 63 are provided and, as the circuit switching units, not only the MII-SW circuit 15 but also an HDMI-SW circuit 64, an IR-SW circuit 65, and a UART-SW circuit 66 are provided. That is, with respect to the four signal standards of Ethernet signals, HDMI signals, UART signals, and IR signals, one of the HDBaseT receiver circuit 12 and the dedicated receiver circuit may be respectively selected. Note that, in the drawing, conneecters and terminals for inputting respective signals (an HDMI terminal connecting to the HDMI receiver circuit 61, a Mini Jack connecting to the IR receiver circuit 62, a D-sub9 terminal connecting to the UART receiver circuit 63, or the like) are omitted.

FIG. 9 is an explanatory diagram on receiver circuit options according to the second embodiment. The table shows the cases the dedicated receiver circuits are selected as the selected receiver circuits with respect all of the four signal standards. That is, the selected receiver circuits are the Phy receiver circuit 13 for Ethernet signals, the HDMI receiver circuit 61 for HDMI signals, the IR receiver circuit 62 for IR signals, and the UART receiver circuit 63 for UART signals.

Note that, not particularly illustrated, in the embodiment, the individual power supply circuits 50 may be provided for the HDMI receiver circuit 61, the IR receiver circuit 62, and the UART receiver circuit 63, and power supply control for the individual power supply circuits 50 may be performed by the power control unit 114. In this case, in the standby mode (network standby mode and the deep standby mode), if the dedicated receiver circuits are selected as the receiver circuits of signals of all of four standards (in the case of the example in FIG. 9), power is not supplied to the HDBaseT receiver circuit 12. Further, the HDBaseT receiver circuit 12 is selected for the respective signals, power is not supplied to the dedicated receiver circuits corresponding to the signals.

In addition, the operation status switching in the standby mode of the HDBaseT receiver circuit 12 is performed in response to whether or not the Ethernet signals are input to the HDBaseT receiver circuit 12 as is the case of the first embodiment.

As has been explained above, according to the projector 1 of the second embodiment, not only the Ethernet signals but also signals of four standards that can be received by the HDBaseT receiver circuit 12 may be constantly received regardless of the specifications of the HDBaseT transmitter 3. Thereby, an interface with higher convenience for the user may be realized.

Note that, in the above described two embodiments, the circuit switching unit (SW circuit) switches the circuit to one of the HDBaseT receiver circuit and the dedicated receiver circuit in response to the selection operation by the user, however, the unit may switch the output target circuits of the respective signals in response to another factor (e.g., external signals that can be received by other than the respective receiver circuits shown in FIG. 8, the internal state of the projector 1, or the like).

Further, as "image display apparatus", the projector 1 has been exemplified, however, the invention may be applied to other display devices or display control devices including a television, a computer, a tablet terminal, an STB (Set Top Box), and an AV amplifier.

Furthermore, the respective component elements of the projection system SY shown in the two embodiments may be provided as programs. In addition, the programs may be stored and provided in various recording media (CD-ROMs, flash memories, or the like). That is, the invention includes the programs for functioning a computer as the respective component elements of the projection system SY and recording media for recording the programs within the scope of the invention. Other changes may be appropriately made without departing from the scope of the invention.

What is claimed is:

1. An image display apparatus comprising:
   an HDBaseT receiver circuit that receives signals based on N (N is an integer number satisfying N≥2) standards that can be transmitted as HDBaseT signals;
   a dedicated receiver circuit that is compliant with a first standard of the N standards and receives signals of the first standard;
   a signal processing unit that processes the signals received by the HDBaseT receiver circuit or the dedicated receiver circuit;
   a circuit switching unit that switches between applying signals of the first standard output from the HDBaseT receiver circuit to the signal processing unit, or applying signals of the first standard output from the dedicated receiver circuit to the signal processing unit; and
   a controller that causes power to be supplied to the HDBaseT receiver circuit and the dedicated receiver circuit when the image display apparatus is in a normal operation mode, and causes power to be supplied to only one of the HDBaseT receiver circuit or the dedicated receiver circuit switched to by the circuit switching unit when the image display apparatus is in a standby mode.

2. The image display apparatus according to claim 1, further comprising:
   individual power supply circuits that individually supply power to the respective receiver circuits of the HDBaseT receiver circuit and the dedicated receiver circuit;
   a power supply control unit that performs power supply control on the respective individual power supply circuits; and
   a mode switching unit that switches a behavior mode of the image display apparatus to one of the normal operation mode and the standby mode,
   wherein the power supply control unit does not supply power to the individual power supply circuit not corresponding to the one of the HDBaseT receiver circuit or the dedicated receiver circuit switched to by the circuit switching unit when in the standby mode.

3. The image display apparatus according to claim 2, further comprising an operation status switching unit that switches an operation status of the HDBaseT receiver circuit among a full-operation status in which signals of the N standards can be received, a second LPF status in which signals of L (L is an integer number satisfying 1≤L≤N-1) types of standards including the signals of the first standard can be received, and a first LPF status in which signals of M (M is an integer number satisfying 1≤M≤L-1) types of standards not including the signals of the first standard can be received,
   wherein, in the case where the output target circuit has been switched to the HDBaseT receiver circuit in the standby mode, the operation status switching unit switches the operation status of the HDBaseT receiver circuit to the second LPF status if the signals of the first standard are input to the HDBaseT receiver circuit, and switches the operation status of the HDBaseT receiver circuit to the first LPF status if the signals of the first standard are not input to the HDBaseT receiver circuit.

4. The image display apparatus according to claim 2, further comprising:
   a signal determination unit that determines whether or not the signals of the first standard input to the dedicated receiver circuit are signals for HDBaseT (receiver) circuit transmitted from an HDBaseT transmitter circuit; and
   a warning unit that issues a warning if the signal determination unit has determined that the signals of the first standard input to the dedicated receiver circuit are the signals for HDBaseT (receiver) circuit.

5. The image display apparatus according to claim 4, wherein the power supply control unit does not supply power to the dedicated receiver circuit if the signal determination unit has determined that the signals of the first standard input to the dedicated receiver circuit are the signals for HDBaseT (receiver) circuit.

6. The image display apparatus according to claim 1, further comprising an operation unit for a user to select the output target circuit,
   wherein the circuit switching unit switches the output target circuit according to a selection operation of the operation unit.

7. The image display apparatus according to claim 1, comprising N of the dedicated receiver circuits that respectively receive signals of different standards,
   wherein the circuit switching unit respectively switches the output target circuits of the N signals to one of the HDBaseT receiver circuit and the dedicated receiver circuits.

8. The image display apparatus according to claim 1, wherein the signals of the first standard are Ethernet signals.

9. A method of controlling an image display apparatus comprising:
   processing signals received by one of an HDBaseT receiver circuit that receives signals based on N (N is an integer number satisfying N≥2) standards that can be transmitted as HDBaseT signals and a dedicated receiver circuit that is compliant with a first standard of the N standards and receives signals of the first standard using a signal processing unit;

switching between applying signals of the first standard output from the HDBaseT receiver circuit to the signal processing unit, or applying signals of the first standard output from the dedicated receiver circuit to the signal processing unit; and causing power to be supplied. to the HDBaseT receiver circuit and the dedicated receiver circuit when the image display apparatus is in a normal operation mode. and causing power to be supplied to only the one of the HDBaseT receiver circuit or the dedicated receiver circuit switched to by the circuit switching unit when the image display apparatus is in a standby mode.

10. The image display apparatus according to claim 1, wherein the first standard is at least one of Ethernet, HDMI, UART and IR.

* * * * *